United States Patent Office 3,242,171
Patented Mar. 22, 1966

3,242,171

COMPLEXES OF ORGANOPHOSPHORUS FLUORIDES WITH ZEROVALENT TRANSITION METALS

Reinhard Schmutzler, Wilmington, Del., assignor to E. I. du Pont de Nemours and Company, Wilmington, Del., a corporation of Delaware No Drawing. Filed Feb. 6, 1963, Ser. No. 256,522
1 Claim. (Cl. 260—242)

This invention relates to novel coordination compounds and coordination polymers of certain transition metals with fluorine-phosphorus-containing ligands. More particularly, it concerns derivatives of zerovalent transition metals with organic aminofluorophosphines, with organic phosphoramidofluoridites and with organic fluorophosphites and fluorothiophosphites.

The novel compositions of this invention have the formula $$M(CO)_x(L)_y$$

wherein M is a transition metal of Periodic Group VIB or the first transition series of Periodic Group VIII; L is a fluorophosphite, a fluorothiophosphite, a phosphoramidofluoridite or aminofluorophosphine ligand; $x$ is an integer from zero through five; $y$ is an integer from one through four; the sum $x$ and $y$ is equal to one-half the difference between the actual atomic number of M and the effective atomic number of M; with the provisio that when M is cobalt, $y$ is one and the product is dimeric.

Hence the novel compositions of this invention comprise coordination compounds, chelate compounds and coordination polymers. The coordination compounds are formed by monofunctional ligands e.g. monofunctional fluorophosphites, fluorothiophosphites, aminofluorophosphines, and phosphoramidofluoridites. From bifunctional ligands, that is from bis-(aminofluorophosphines), bis-(phosphoramidofluoridites), bis-(fluorophosphites), and bis-(fluorothiophosphites), very stable coordination polymers and chelate compounds are formed.

The chelate compounds of the invention have the sub-generic formula $$M(CO_x(L')_y$$

wherein M is iron, nickel, chromium, tungsten or molybdenum, $x$ is one through four, $y$ is one or two, and the sum of $x$ and $y$ is equal to one-half the difference between the effective atomic number of M and the actual atomic number of M. L is a bis-(aminofluorophosphine), bis-(fluorophosphite), bis-fluorothiophosphite or bis-(phosphoramidofluoridite) ligand with the functional groups so arranged to permit the formation of a five-to-seven membered chelate ring; that is a bifunctional ligand of the type:

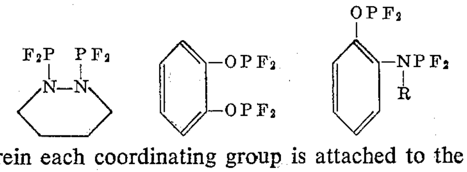

wherein each coordinating group is attached to the same metal atom.

The coordination polymers of this invention have repeating units represented by the subgenus $$[M(CO)_x(L'')_y]$$

wherein M is iron, nickel, chromium, molybdenum or tungsten, $x$ is one through four, $y$ is one or two, the sum of $x$ and $y$ is equal to one-half the difference between the effective atomic number of M and the actual atomic number of M, and L″ is a bis-(aminofluorophosphine), a bis-(phosphoramidofluoridite), a bis-(fluorophosphite), or a bis-(fluorothiophosphite), the two coordinating groups being attached to two different metal atoms.

The effective atomic number of the metal as used herein is equal to the atomic number of the next heavier inert gas and is derived by adding to the atomic number of the metal the number of electrons gained by coordination-two for each coordinated group. To illustrate the principle for the composition, $Ni(CO)_x(L)_y$, the effective atomic number of nickel is 36, the atomic number of the krypton. The atomic number of nickel is 28. Thus, eight additional electrons are required and these are provided by the CO and the other coordinating groups, L. Thus, in the case of monofunctional ligand-nickel complexes each ligand donates two electrons, the sum of $x$ and $y$ must be 4 and the nickel complexes are of the types $Ni(CO)(L)_3$, $Ni(CO)_2(L)_2$, $Ni(CO)_3L$ and $NiL_4$. In the representation of the chelate compositions each ligand, being bifunctional, provides four electrons to the metal atom and the nickel chelates are of the types: $Ni(CO)_2L'$ and $NiL'_2$; in the polymeric structures, each ligand provides four electrons, two to each of the metal atoms to which it is bound. Hence the nickel coordination polymers have the overall compositions represented by the formulae; $\{Ni(CO)_2L''\}$ and $\{NiL''_2\}$. The principle is applied in the same manner to the other metals.

The process for making the novel products of this invention comprises contacting the metal carbonyl with the ligand. No catalyst or solvent is required. When the reaction is carried out at atmospheric pressure and at room temperature, partially substituted products containing CO are obtained. By heating a partially substituted product with excess ligand, usually but not necessarily under vacuum, additional carbon monoxide is given up and products containing less CO, and in some instances completely substituted products, are isolated.

The monofunctional ligands in the coordination compounds are:

(1) Aminofluorophosphines having the formulae $$(R_2N)_{3-a}PF_a \text{ or } (R'N)_{3-a}PF_a$$

wherein $a$ is 1–2 and wherein the R groups are monovalent hydrocarbon radicals such as alkyl and aryl and the R′ groups are bivalent hydrocarbon radicals. Typical R and R′ groups are methyl, ethyl, isoamyl, phenyl, benzyl, cyclohexyl, α- and β-naphthyl, tetramethylene, pentamethylene; (2) fluorophosphites and fluorothiophosphites having the formula $$(RX)_aPR_{3-a}$$

wherein $a$ is 1–2, X is O or S and R is an aliphatic hydrocarbon radical such as alkyl, aralkyl and cycloalkyl or an aromatic or substituted-aromatic radical. The following groups are typical: methyl, ethyl, propyl, n-butyl, isobutyl, hexyl, heptyl, octyl, phenyl, tolyl, naphthyl, ethylphenyl, benzyl, p-chlorophenyl, p-methoxyphenyl, 2-chloro-4-t-butylphenyl, 2,4-dichlorophenyl, 2,5-dichlorophenyl, 3,4-dichlorophenyl, 2,4,5-trichlorophenyl, 2,4,6-trichlorophenyl; and (3) phosphoramidofluoridites of the formula

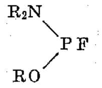

and

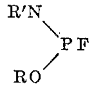

wherein the R and R′ groups are as defined above. These compounds may be looked upon as a combination of (1) and (2) above.

Typical monofunctional ligands within the purview of the instant discovery are:

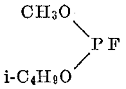

$(C_2H_5O)_2PF$
$(n\text{-}C_3H_7O)_2PF$

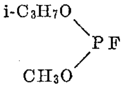

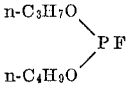

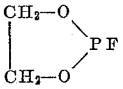

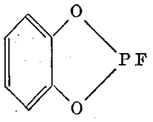

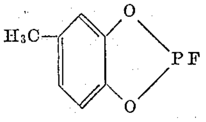

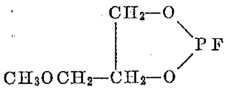

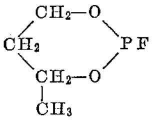

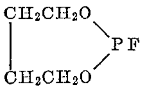

$(n\text{-}C_4H_9O)_2PF$ $(n\text{-}C_8H_{17}O)_2PF$
$(C_6H_5O)_2PF$ $(p\text{-}ClC_6H_4O)_2PF$ (o, m, or $p\text{-}C_3CC_6H_4O)_2PF$ $(o\text{-}CH_3OC_6H_4O)_2PF$

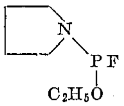

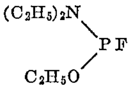

$C_2H_5OPF_2$ $(C_2H_5S)_2PF$ $C_2H_5SPF_2$

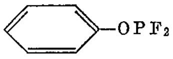

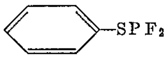

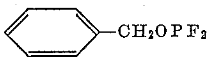

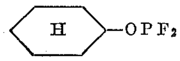

$(n\text{-}C_5H_{11}OPF_2)$

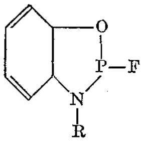

$(CH_3)_2NPF_2$ $(C_2H_5)_2NPF_2$
$(n\text{-}C_3H_7)_2NPF_2$ $(iso\text{-}C_5H_{11})_2NPF_2$

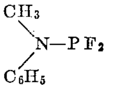

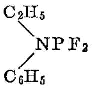

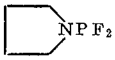

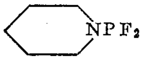

$[(CH_3)_2N]_2PF$ $[(C_2H_5)_2N]_2PF$

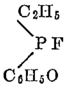

etc.

The bifunctional ligands employed in the formation of the coordination polymers are of the types:

(1) $F_{3-a}P(XR'X)_aPF_{3-a}$ wherein $a$=1–2, X is O or S and R' is a bivalent aliphatic or aromatic hydrocarbon radical such as polymethylene or, in the case where $a$=1, phenylene radicals, xylylene radicals, cyclohexylene radicals and cyclohexylenedimethylene radicals; and (2)

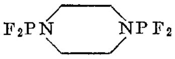

wherein both nitrogen atoms are in the same heterocyclic ring, for example as in the rings

and

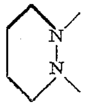

Typical of the bifunctional P–F compounds within the scope of this invention are the following:

$F_2POCH_2CH_2OPF_2$

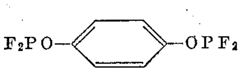

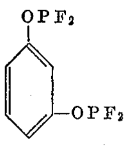

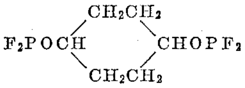

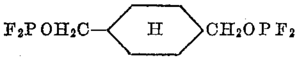

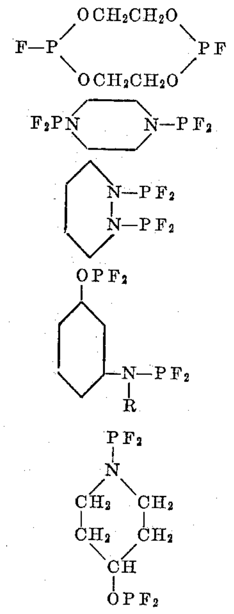

etc.

The coordination polymers of the invention are linear polymers and crosslinked polymers, depending upon the number of carbon monoxide groups replaced by the bifunctional phosphorus-fluorine ligand. For example, in the case of nickel-containing coordination polymers, linear polymers

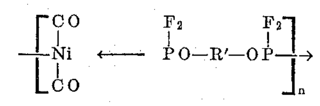

wherein R' is phenylene, ethylene, etc. and

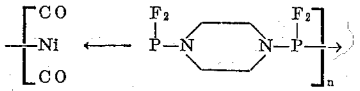

are readily obtained. The $n$ in each instance indicates the degree of polymerization. Replacement of three carbon monoxide groups by ligand gives polymers crosslinked in one dimension ($a$) and replacement of four CO groups by ligand, polymers crosslinked in all dimensions ($b$) as depicted by the following structures:

(a)

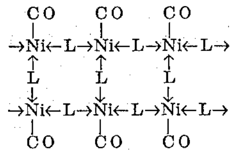

and (b)

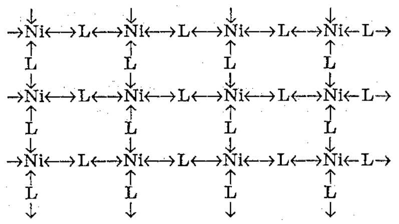

Analogous structures are formed by the other metals.

Bifunctional ligands forming chelate compounds are of the types

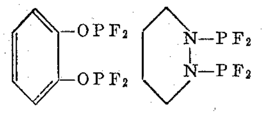

and

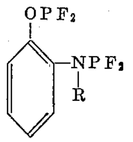

which permit the formation of stable five to seven membered heterocyclic rings containing the metal atom. In the case of nickel, which is used only by way of illustration, two or four of the carbon monoxide groups can be replaced by the chelating group to form the compounds

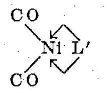

and

Of course the CO groups in the first structure can also be replaced by monofunctional ligands to yield chelate compounds of the composition L(CO)NiL' and $L_2$NiL'.

Thus, when one of the aforementioned metal carbonyls is contacted with an aminofluorophosphine, a phosphoramidofluoridite, a fluorothiophosphite, or a fluorophosphite ligand at room temperature, carbon monoxide is vigorously exchanged and new coordination products form. Depending on the nature of the reactants, their ratio and the reaction conditions, partially or totally substituted derivatives of the metal carbonyl are obtained.

The metal carbonyl starting materials are simple carbonyls, that is $M(CO)_z$ wherein $z$ is 4–6, depending upon the number of CO groups necessary to satisfy the effective atomic number of the metal. However, for the cobalt complexes, the starting carbonyl is $Co_2(CO)_8$. In addition to the hexacarbonyls of molybdenum and tungsten, the cycloheptatriene tricarbonyls of these metals are also useful reactants, especially for the preparation of the tungsten and molybdenum tricarbonyl derivatives of this invention.

The process of this invention comprises combining the carbonyl reactant with the ligand, exchange occurring on contact. Partially substituted products are obtained when the reactants are contacted at atmospheric pressure and relatively low temperatures, i.e. 20–50° C. Where complete replacement of CO is possible, for instance with nickel carbonyl, higher temperatures usually are required to cause complete exchange of CO and ligand. Increasing the temperature to 75–95° C. by external heating is usually sufficient. When the ligand itself has a low boiling point, such as with dimethylaminofluorophosphine which boils at about 40° C., completely substituted products are obtained by conducting the reaction in a sealed system at autogenous pressures. The order of addition of the reactants has no influence on the product obtained.

The ligands employed in the process of this invention may be prepared by any of several techniques. For example, the aminofluorophosphines are conveniently obtained by a two-step process which involves first preparing the aminochlorophosphine by the well-known reaction of a secondary amine and phosphorus trichloride, such as is described in Ann. 326, 129 (1903), and fluorinating the chloro compound with potassium fluorosulfinate, antimony trifluoride, sodium fluoride in tetramethylene sulfone and the like as the fluorinating agents. The aminodifluorophosphine is isolated by distillation. The fluorophosphites are prepared from the dichlorophosphites in an analogous manner. The fluorothiophosphites are prepared by fluorination of chlorothiophosphites, which are obtained from $PCl_3$ and the appropriate mercaptan.

The phosphoramidofluoridites are prepared by the fluorination of phosphoramidochloridites.

Phosphoramidochloridites are made by either of two ways; dichlorophosphite and a stoichiometric amount of secondary amine or dialkylaminodichlorophosphine and alcohol.

The following examples are given for the purpose of illustration and are not to be construed as limiting. Parts, where given, are parts by weight. In all instances, the reactions are carried out in an atmosphere of dry nitrogen.

EXAMPLE 1

*Tetrakis-(n-propyldifluorophosphite)nickel (0)*

A three-necked flask is fitted with a thermometer, dropping funnel with side arm and a Dry-Ice condenser, connected to a mercury valve. The system is evacuated and filled with $N_2$. Nickel tetracarbonyl, 17.07 parts, is then placed into the dropping funnel and is added dropwise with stirring to 77 parts of n-$C_3H_7OPF_2$ in the flask. Carbon monoxide is liberated readily, but after 20 hours' reflux CO is still present.

The crude mixture (77.1 parts) is then transferred to a pressure cylinder and is heated with shaking at 100° C. (2 hrs.) and 120° C. (1 hour). The cylinder is allowed to stand overnight, is cooled to −80° C. and opened. The I.R. spectrum of the faintly yellow liquid indicates that nearly all CO is replaced. The liquid product is rinsed out with ether. Distillation through a glass-helix packed column (ca. 15 parts crude product) gives two fractions. The I.R. spectrum of fraction 1, B.P. 46–48° C./0.2, $n_D^{26}=1.4110$ (0.8 part), exhibits a strong absorption in the CO region (2060 cm.$^{-1}$). This product is a partially substituted derivative of $Ni(CO)_4$.

A few drops of liquid having a lower content of CO is obtained on continued distillation before another pure product is obtained boiling at 140.5–143° C./0.5 mm.; $n_D^{25.5}=1.4321$. The I.R. spectrum shows that CO groups are completely absent. A total of 7.8 parts of pure, colorless liquid is collected. The product is identified by analysis as $Ni(n\text{-}C_3H_7OPF_2)_4$.

*Analysis.*—Calcd. for $Ni(n\text{-}C_3H_7OPF_2)_4$: C, 25.2; H, 4.9; P, 21.7; F, 26.6; Ni, 10.3; mol. wt., 570.98. Found: C, 25.0; H, 4.9; P, 21.4; F, 26.9; Ni, 10.3; mol wt., 535.

The compound is diamagnetic: magnetic susceptibility=—283.1×10$^{-6}$ [c.g.s.]; magnetic moment $$\mu_{eff.}=0.38 \text{ B.M.}$$

EXAMPLE 2

*Tetrakis-(phenyldifluorophosphite)nickel (0)*

(*a*) Direct reaction of $Ni(CO)_4$ with $C_6H_5OPF_2$: The reaction is carried out in a three-necked flask fitted with a thermometer, a reflux condenser with drying tube and stopcock-adapter on top and a small graduated dropping funnel. The system is evacuated and charged in a countercurrent of $N_2$ with 8.6 parts of $Ni(CO)_4$ (dropping funnel) and 41 parts of $C_6H_5OPF_2$ (flask). On adding $Ni(CO)_4$ dropwise from the dropping funnel, CO is vigorously liberated on stirring at room temperature (16 hrs.). More CO is evolved when the temperature is slowly raised first to 90° C., then to 120° C. (1 hr.). The formation of CO essentially ceases at 150° C. inner temperature, indicating the presence of a complex of remarkable stability. The IR spectrum of the liquid mixture exhibits no absorption in the CO region. The product is vigorously oxidized by $HNO_3$ and slowly decomposed with formation of elemental Ni on heating with 30% aqueous NaOH, typical reactions for phosphine complexes of zerovalent Ni.

The volatile materials, including excess $C_6H_5OPF_2$, are removed at 60° C./0.5 mm. by pumping for 2 hrs. The residue is analytically pure $Ni(C_6H_5OPF_2)_4$ $$(n_D^{25}=1.5412)$$

*Analysis.*—Calcd. for $Ni(C_6H_5OPF_2)_4$: C, 40.8; H, 2.9; P, 17.4; F, 21.5; Ni, 8.3; mol. wt., 707. Found: C, 40.8; H, 2.9; P, 17.2; F, 21.5; Ni, 8.3; mol wt., 736, 746 (in cyclohexane).

Magnetic measurement:

molar susceptibility=−356×10$^{-6}$ [c.g.s.]

corresponding to a magnetic moment $\mu_{eff.}=0.27$ B.M.

(*b*) Fluorination of $Ni(C_6H_5OPCl_2)_4$: A three-necked flask fitted with reflux condenser, mechanical stirrer and stopcock-adapter is evacuated and, in a counter-current of $N_2$, is charged with a solution of 12.6 parts of $Ni(C_6H_5OPCl_2)_4$ in 130 parts of absolute benzene in which 30.5 parts of $KSO_2F$ is suspended. $SO_2$ is formed on heating the mixture to reflux (6 hrs.). The brown mixture is filtered hot under $N_2$, and a yellow oil is left on evaporation of the benezene. The IR spectrum of the oil is identical to that of the product prepared independenly, in (*a*) and the analysis for Ni is also consistent with the expected product: $Ni(C_6H_5OPF_2)_4$.

*Analysis.*—Calcd.: Ni, 8.30. Found: Ni, 7.95, 819.

*Bis-[dimethylaminodifluorophosphine]-dicarbonyl nickel (0)*

The reaction is conducted in a three-necked flask, equipped with a thermometer reaching to the bottom of the flask, a dropping funnel, and a water-cooled reflux condenser with a Dry Ice condenser over top, the latter being connected to a mercury valve, to prevent contact with air. The system is evacuated and filled with nitrogen. Dimethylaminodifluorophosphine (45.2 parts) is placed in the flask in a slight countercurrent of nitrogen, and 34.14 parts of nickel carbonyl is gradually added with stirring from the dropping funnel. Carbon monoxide is evolved vigorously and stirring at room temperature is continued for a total of 40 hours. No further carbon monoxide is evolved on heating to 50° C. No volatile material is pumped off at 25°/0.1 mm. The liquid remaining is identified by analysis as $$Ni(CO)_2[(CH_3)_2NPF_2]_2:$$

C, 21.1; H, 3.6; F, 22.3; N, 8.2; Ni, 17.2; P, 18.2; mol. wt. 341; Found: C, 21.3; H, 3.7; F, 22.4; N, 8.5; Ni, 16.9; P, 18.2; mol. wt. 371.

*I.R. spectrum (pure liquid).*—2910 (m.), 2840 (v.w.), 2800 (w.); C–H: 2083 (w.), 2040, 1993 (v.s.); C–O; 1482, 1450 (m.), 1300, 1181 (s.), 1068 (m.), 985 (v.s.), 829, 800, 775 (v.s.); P–F: 706 (v.s.).

The compound is unchanged when exposed to the atmosphere for limited periods. $Ni(CO)_2[(CH_3)_2N\cdot PF_2]_2$ turns very viscous but does not solidify when cooled to −80° C.

EXAMPLE 4

*Bis-[piperidine-N-difluorophosphine]-dicarbonyl nickel (0)*

The system as described in the previous example is evacuated and filled with nitrogen. Nickel carbonyl (8.5 parts) is placed in the flask and 15.3 parts of piperidine-N-difluouophosphine is added from the dropping funnel. Carbon monoxide is evolved briskly at room temperature. After 16 hrs. stirring at room temperature, the reaction mixtures solidifies completely, and no unreacted carbonyl is present. Upon heating to ca. 50° C. inner temperature, the colorless solid melts, but no further gas evolution occurs. The reaction is considered complete. The complex is extremely soluble in all common organic solvents and recrystallization is difficult. The crude material as obtained in the reaction is found to be analytically pure.

*Analysis.*—Calcd. for $Ni(CO)_2(C_5H_{10}N\cdot PF_2)_2$: C, 34.2; H, 4.8; F, 18.1; N, 6.7; Ni, 13.9; P, 14.7; mol. wt. 420.96. Found: C, 34.3; H, 5.0; F, 17.7; N, 6.4; Ni, 13.9; P, 14.7; mol. wt., 413, 421.

Beautiful prisms, as long as 20–30 mm., are grown by dissolving the complex in the minimum amount of cyclohexane, and allowing the solvent to evaporate gradually in the atmosphere. The melting point of the air-stable compound is 39.5° C.

*I.R. spectrum* (*in Nujol*).—2041, 1993 (v.s.); C–O: 1335, 1274 (m.); 1205, 1160, 1112, 1060 (v.s.), 1023 (m.), 958 (v.s.), 984 (m.), 850 (w.), 828,, 802, 780 (v.s.); P–F: 696 (s.).

EXAMPLE 5

*Tetrakis-[dimethylaminodifluorophosphine]-nickel (0)*

The apparatus used in this reaction is the same as described in Example 3.

From a dropping funnel, 4.58 parts of nickel carbonyl is added dropwise with stirring to 18.1 parts of dimethylaminodifluorophosphine. Carbon monoxide is evolved vigorously. The temperature is raised to the boiling point of the fluorophosphine after 3 hours stirring at room temperature. After 5 hours reflux (inner temperature 50° C.) I.R. reveals that strong carbonyl absorptions are still present.

The reaction mixture is then transferred under nitrogen protection to a pressure cylinder which is cooled with liquid nitrogen and evacuated to 0.05 mm. The cylinder is sealed and heated for 3.5 hours at 120–130° C. oil bath temperature. CO pressure is noted upon opening the cylinder at −80° C., but the I.R. spectrum of the liquid shows carbonyl groups are still present. No different result is obtained when the mixture is heated for 7.5 hrs. at 140° C., after an additional 3 parts of dimethylaminofluorophosphine is added. Total substitution of the carbon monoxide is finally effected by adding 10 parts of the fluorophosphine and heating the mixture for 5 hours at 120–130° C. The cylinder is cooled and opened, and the contents are rinsed out with ether. Part of the product is in the form of large white crystals. The faintly yellow ether solution is boiled 5 minutes with charcoal, partially evaporated, and chilled. Hard colorless crystals (8.2 parts, 59.5%), M.P. 110.5–111.5° C., are obtained. An analytical sample is obtained by recrystallizing twice from ether.

*Analysis.*—Calcd. for $Ni[(CH_3)_2N{\cdot}PF_2]_4$: C, 18.8; H, 4.7; F, 29.7; N, 11.0; Ni, 11.5; P, 24.2. Found: C, 18.6; H, 4.9; F, 29.5; N, 10.8; Ni, 11.6; P, 24.7.

The compound is diamagnetic with magnetic susceptibility $= -253 \times 10^{-6}$ [c.g.s.], corresponding to the magnetic moment $\mu_{eff.} = 0.33$ B.M.

*I.R. spectrum* (*solid in* KBr).—2924 (s.), 2858 (w.), 2818 (m.); C–H: 1484 (s.), 1454 (s.), 1439 (w.), 1412 (w.), 1295 (s.), 1182 (s.), 1067 (s.), 981 (v.s.), 874 (w.), 799 (v.s.), 760 (v.s.); P–F: 702 (v.s.).

EXAMPLE 6

*Tetrakis-[piperidine-N-difluorophosphine]-nickel (0)*

The reaction is carried out in the apparatus described in Example 2. In a countercurrent of nitrogen, 46 parts of piperidine-N-difluorophosphine is placed in the flask while 6.83 parts of nickel carbonyl is added dropwise with stirring within 40 minutes, carbon monoxide being vigorously evolved. After 7 hours stirring at gradually increased temperature (to an inner temperature of 100° C.) a sudden rise in temperature occurs and the contents of the flask solidifies. I.R. indicates complete substitution of the carbonyl groups. An analytical sample is recrystallized from benzene, M.P. 164–165.5° C.

*Analysis.*—Calcd. for $Ni(C_5H_{10}N{\cdot}PF_2)_4$: C, 35.8; H, 6.0; F, 22.6; N, 8.3; Ni, 8.8; P, 18.5; mol wt., 671.18. Found: C, 35.7; H, 6.1; F, 22.8; N, 8.3; Ni, 8.8; P, 18.7; mol. wt., 670.

Weissenberg photographs, powder diffraction studies and density measurements indicate the unit cell of the compound to be tetragonal, containing two molecules with the nickel atoms of (000) and (½ ½ ½);

$$a=b=13.30 \text{ A.}; c=8.24 \text{ A.}$$

$Ni(C_5H_{10}N{\cdot}PF_2)_4$ is diamagnetic: magnetic susceptibility $= -337.5 \times 10^{-6}$ [c.g.s.] at 297° K., corresponding to a magnetic moment $\mu_{eff.} = 0.44$ B.M.

*I.R. spectrum* (*solid in* KBr).—2934 (s.), 2858 (m.); C–H: 1465 (w.), 1451 (m.), 1375 (s.), 1341 (m.), 1278 (m.), 1256 (w.), 1206 (s.), 1166 (s.), 1114 (s.), 1060 (v.s.), 1025 (m.), 958 (v.s.), 896 (m.), 854 (s.); 834 (m.), 813 (w.), 776 (v.s.), 762 (m.), 744 (w.); P–F: 696 (v.s.).

EXAMPLE 7

*Reaction of ethyleneglycol-bis-difluorophosphite with* $Ni(CO)_4$

With complete exclusion of atmospheric oxygen, 6.85 parts of $Ni(CO)_4$ is gradually added to 24.2 parts of $F_2POCH_2CH_2OPF_2$ with stirring, CO being vigorously evolved. Stirring at room temperature is continued for 20 hrs.; then the temperature is gradually increased. After 6 hrs. most of the reaction mixture is converted into a solid, gummy material. An I.R. spectrum of a small amount of the semi-solid material indicates that CO groups are still present. Heating at 80° C. is then continued for 20 hrs., after another 9.9 parts of the fluorophosphite is added. The colorless, brittle solid thus obtained is finely ground in a mortar, washed with methanol and petroleum ether, and dried under vacuum.

A sample of the crude product when heated on a melting point block in the atmosphere turns only faintly yellow when heated above 220° C.; no melting is observed. The material is insoluble in all common solvents including THF, DMFA, DMSO, nitrobenzene, Diglyme, DMCA, ethanol, benzene, petroleum ether, etc.

*Analysis.*—Calcd. for $Ni(F_2POCH_2CH_2OPF_2)_2$: C, 10.6; H, 1.8; P, 27.4; F, 33.4; Ni, 12.9. Found: C, 11.9; H, 2.1; P, 28.2; F, 31.5; Ni, 12.0.

EXAMPLE 8

*Reaction of hydroquinone-bis-difluorophospite with* $Ni(CO)_4$

The conditions employed are described in Example 7. A vigorous reaction occurs on addition of 6 parts of $Ni(CO)_4$ to 21 parts of $F_2POC_6H_4OPF_2$ with stirring. After 20 hours stirring at room temperature, the temperature is gradually increased, and after 3 hours (temperature ca. 80° C.) the reaction mixture suddenly solidifies to a light solid containing numerous gas bubbles. The solid material is heated further at 80–100° C. for a total of 10 hrs. The brittle solid product is air stable and can be ground finely to give a dust-like white powder. The product is dried at 80° C./0.1 mm. for 20 hours.

*Analysis.*—Calcd. for $Ni(F_2POC_6H_4OPF_2)_2$: C, 26.2; H, 1.5; P, 22.5; F, 27.6; Ni, 10.7. Found: C, 26.5; H, 1.7; P, 22.5; F, 26.4; Ni, 10.7.

The product is similar in its properties to the polymeric glycol-bis(difluorophosphite) nickel (0) complex. It is insoluble in a wide variety of organic solvents. No melting and no decomposition except for some darkening is observed when the product is heated as high as 280° C. in the atmosphere.

EXAMPLE 9

*Reaction of* $Ni(CO)_4$ *with hydroquinone-bis-difluorophosphite*

In a nitrogen atmosphere, 12.3 parts of hydroquinone-bis-difluorophosphite is added dropwise with stirring to 11.9 parts of nickel carbonyl. Upon stirring at room temperature for 20 hours, a small amount of a white precipitate is formed. Stirring is continued at 50° C. for 8 hours after another 8.5 parts of nickel carbonyl is added and additional precipitate is formed.

The reaction mixture is vacuum distilled, beginning at 20° C./50 mm. and continuing to about 30° C./0.1 mm., to remove volatile products. The black, rubbery residue is dried at 60° C./0.1 mm. Elemental analysis is consistent with that expected for a difluorophosphite nickel dicarbonyl coordination polymer:

*Analysis.*—Calcd. for

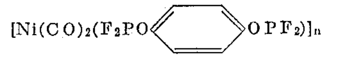

C, 26.6; H, 1.1; F, 21.1; Ni, 16.3; P, 17.2. Found: C, 26.5; H, 1.3; F, 21.2; Ni, 16.1; P, 18.3.

The product is insoluble in and chemically unchanged by a wide variety of organic solvents. Its I.R. spectrum confirms the presence of CO groups indicative of a nickel dicarbonyl derivative.

EXAMPLE 10

*Tetrakis(1,3-dioxa-4,5-benzo-2-fluorophosphole) nickel (0)*

The apparatus used is as described for the previous examples involving nickel carbonyl. In a countercurrent of nitrogen 47.5 parts of 1,3-dioxa-4,5-benzo-2-fluorophosphole is placed in the flask, while 8.5 parts of nickel carbonyl is gradually added from a dropping funnel. Carbon monoxide is evolved, and the reaction is brought to completion by stirring at gradually increasing temperature up to 130° C. Upon cooling, white crystals precipitate, the I.R. spectrum of which shows no CO absorption. The product obtained (33.5 parts, 97.8%) is already of high purity. A small analytical sample is recrystallized from benzene to give beautiful plates, M.P. 129–130° C.

*Analysis.*—Calcd. for $Ni(C_6H_4O_2PF)_4$: C, 41.7; H, 2.3; F, 11.0; Ni, 8.5; P, 17.9; mol. wt., 691. Found: C, 42.1; H, 2.5; F, 10.8; Ni, 8.6; P, 18.0; mol. wt., 679.

*I.R. spectrum (solid in* KBr).—Ca: 3070 (v.s.); 1624 (m.); 1479 (s.); 1327 (s.); 1222 (v.s.); 1152 (m.); 1120 (w.); 1092 (m.); 1008 (s.); 932 (w.); 911 (m.); 864, 843, 815, 799, 785 (v.s.); 745 (v.s.); 719 (m.).

The reactions of the cycloheptatriene tricarbonyl complexes of molybdenum or tungsten which follow are conducted by mixing 0.01 mole of the $\pi$-complex with excess of the ligand below room temperature in a three-necked flask, equipped with a reflux condenser, a thermometer, and a stopcock adapter. The apparatus is evacuated and filled with nitrogen.

The mildly exothermic exchange reaction is controlled by ice cooling (temperatures not exceeding 45–50° C.). The red-brown mixtures are stirred for 20 to 30 minutes; the volatile products are then removed in vacuo (ca. 1 mm., temp. $\leqq$30° C.). The residue is extracted with several 10 ml. portions of hexane, and the combined extracts are decolorized by brief boiling with charcoal. After partial evaporation of the solvent, crystallization is effected with ice or Dry Ice.

EXAMPLE 11

*Tris-[dimethylaminodifluorophosphine]-tricarbonyl-molybdenum (0)*

From 2.72 parts of cycloheptatriene molybdenum tricarbonyl and 17 parts of dimethylaminodifluorophosphine there is obtained 3.0 parts (58%) of colorless crystals, M.P. 56–57° (after two recrystallizations).

*Analysis.*—Calcd. for $[(CH_3)_2N{\cdot}PF_2]_3Mo(CO)_3$: C, 20.8; H, 3.5; F, 22.0; Mo, 18.5; N, 8.1; P, 17.9; mol. wt., 519.1. Found: C, 20.7; H, 3.4; F, 22.1; Mo, 19.0; N, 7.9; P, 16.8; mol. wt., 510.

*I.R. spectrum (solid in* KBr).—2925 (m.), 2858, 2818 (sh.); C–H: 2000, 1923 (v.s.), 1481 (m.), 1456 (m.), 1299 (s.), 1175 (s.), 1067 (m.), 985 (v.w.), 826 (sh.), 808 (v.s., bd.), 777 (s., bd.); P–F: 714 (sh.), 705 (v.s.).

EXAMPLE 12

*Tris[diethylaminodifluorophosphine]tricarbonyl-molybdenum (0)*

A liquid, undistillable product is obtained from 2.72 parts of cycloheptatriene molybdenum tricarbonyl and 12 parts of diethylaminodifluorophosphine. The material does not crystallize even at −80° C. The volatile products are removed in vacuo at 40–50° C./0.05 mm. and the remaining colorless oil ($n_D^{27}$=1.5284) is analyzed.

*Analysis.*—Calcd. for $[(C_2H_5)_2N{\cdot}PF_2]_3Mo(CO)_3$: C, 29.9; H, 5.0; N, 7.0. Found: C, 30.3; H, 5.2; N, 7.3.

*I.R. spectrum (solution in benzene).*—2970 (m.), 2915 (sh.); C–H: 1995, 1919 (v.s.); C–O: 1460 (m.), 1381 (m.), 1289 (w.), 1205 (s.), 1166 (s.), 1098 (w.), 1064 (w.), 1021 (s.), 950 (s.), 922 (m.), 834 (s.), 804 (s., bd.), 790 (s., bd.); P–F.

EXAMPLE 13

*Tris-[piperidine-N-difluorophosphine]-tricarbonyl-molybdenum (0)*

The reaction of 2.72 parts of cycloheptatriene molybdenum tricarbonyl with 17 parts of piperidine-N-difluorophosphine gives 4.0 parts of colorless crystals, M.P. 100° C. (after two recrystallizations from hexane).

*Analysis.*—Calcd. for $[C_5H_{10}N{\cdot}PF_2]_3Mo(CO)_3$: C, 33.8; H, 4.7; F, 17.8; Mo, 15.0; N, 6.6; P, 14.6; mol. wt., 639.3. Found: C, 33.6; H, 4.6; F, 18.4; Mo, 16.7; N, 6.4; P, 14.0; max. wt., 600.

*I.R. spectrum (solid in* KBr).—2924 (m.), 2839 (m.); C–H: 1996, 1934 (v.s.), 1890 (sh.); C–O: 1453, 1444 (m.), 1375 (s.), 1361 (w.), 1336 (s.), 1277 (m.), 1203 (s.), 1152 (s.), 1112 (s.), 1067, 1060 (s.), 1025 (m.), 959 (v.s.), 896 (v.s.), 853 (s.), 834 (m.), 816, 802 (v.s.), 766 (v.s.); P–F: 695 (v.s.).

EXAMPLE 14

*Tetrakis[piperidine-N-difluorophosphine] dicarbonylmolybdenum (0)*

A Monel bomb is flushed with nitrogen and charged with a mixture of 30.6 parts of piperidine-N-difluorophosphine and 10.5 parts of molybdenum hexacarbonyl. The cylinder is sealed, cooled to −190° C., evacuated to 0.05 mm. and heated for 5 hrs. in an oil bath at 120° C. Strong carbon monoxide pressure was noted when the cylinder was opened at −80° C. The cylinder is sealed again and heated for two additional 4 hr. periods at 120–140° C.

A faintly yellow liquid is obtained which is rinsed out with ether and decolorized by brief boiling with charcoal. Evaporation in vacuo (first aspirator, then oil pump) at room temperature leaves a viscous oil (2 hr. pumped at 30° C./0.5 min.). This oil is dissolved in the minimum amount of hot ether, and hexane is added until precipitation begins. Upon cooling in a refrigerator, 2.6 parts of a white solid precipitate is obtained which is recrystallized from ether-hexane and dried in vacuo. M.P. (sealed tube) 142.0–142.8° C. (with darkening).

*Analysis.*—Calcd. for $(C_5H_{10}N{\cdot}PF_2)_4Mo(CO)_2$: C, 34.6; H, 5.3; F, 19.9; Mo, 12.6; N, 7.3; P, 16.2; mol. wt., 764.4. Found: C, 34.8; H, 5.7; F, 19.5; Mo, 13.6; N, 7.1; P, 16.6; mol. wt., 756, 734.

*I.R. spectrum (solid in* KBr).—2917, 2840 (s.); C–H: 1946, 1897 (v.s.); C–O (cis): 1450, 1442 (m.), 1373 (s.), 1333, 1277 (m.), 1204, 1160, 1110 (s.), 1064 (v.s.), 1025 (m.), 957 (v.s.), 898, 855 (m.), 827, 796, 779 (v.s.), 769 (sh.); P–F: 752 (v.s.), 693 (v.s.).

EXAMPLE 15

*Tris-[n-propyldifluorophosphite]-tricarbonyl-molybdenum (0)*

Upon reaction of 2.72 parts of cycloheptatrienetricarbonyl molybdenum (0) with 12.8 parts of n-propyldifluorophosphite a product, solid at −80° C., but liquid at room temperature is obtained. Distillation in a high vacuum gives 3.0 parts (53.3%) of a colorless liquid, B.P. 125° C./0.05 mm.

*Analysis.*—Calcd. for $(C_3H_7OPF_2)_3Mo(CO)_3$: C, 25.6; H, 3.7; F, 20.2; P, 16.5; mol. wt., 564.19. Found: C, 26.9; H, 3.9; F, 20.0; P, 16.1; mol. wt., 530.

*I.R. spectrum (pure liquid).*—2960 (m.), 2880 (sh.), 2020, 1947 (v.s.), 1458 (w.), 1384 (s.), 1198 (v.s.), 1143 (s., bd.), 1049 (m.), 1000 (v.s.), 904 (m.), 842 (vs., bd.), 809 (v.s.), 725 (w.).

EXAMPLE 16

*Tris-[phenyldifluorophosphite]-tricarbonyl-molybdenum (0)*

From the reaction of 2.72 parts of cycloheptatrienetricarbonyl molybdenum (0) with 14.3 parts of phenyldifluorophosphite there is obtained 3.9 parts (58.6%) of large white crystals; M.P. 47° C. (after two recrystalizations from hexane at −80° C.).

*Analysis.*—Calcd. for $(C_6H_5OPF_2)_3Mo(CO)_3$: C, 37.9; H, 2.3; F, 17.1; Mo, 14.4; P, 14.0; mol. wt., 666.2. Found: C, 38.1; H, 2.3; F, 17.4; Mo, 15.05; P, 13.6; mol. wt., 660.

*I.R. spectrum* (solid in KBr).—3070, 2908 (w.), 2025, 1954 (v.s.), 1930 (sh.), 1593 (s.), 1488 (s.), 1454 (m.), 1381 (w.), 1179, 1159 (v.s.), 1068 (m.), 1026, 1007 (s.), 984 (w.), 948, 935 (v.s.), 906 (s), 835, 828 (v.s.), 766 (s.), 734 (s.), 690 (s.).

EXAMPLE 17

*Reaction of n-propyldifluorophosphite with molybdenum hexacorbonyl*

A pressure cylinder is flushed with nitrogen and charged with a mixture of 26.4 parts of molybdenum hexacarbonyl and 75.8 parts of n-propyldifluorophosphite. The cylinder is sealed, cooled to −190° C., evacuated to 0.5 mm. and sealed again. It is heated for 4 hrs. at 120° C. CO pressure is noted when the cylinder is opened after having been cooled to −80° C. The cylinder is cooled to −190° C., evacuated and heated for another 12 hr. period at ca. 180° C. Carbon monoxide is blown off at −80° C. The liquid product is distilled in vacuo through a regular Liebig condenser, the following fractions (colorless liquids) being taken:

| | Parts |
|---|---|
| (1) B.R. 110–130° C./0.2 mm., $n_D^{25}=1.4522$ | 3.8 |
| (2) B.R. 130–145° C./0.2 mm., $n_D^{25}=1.4740$ | 5.8 |
| (3) B.R. 145–150° C./0.2 mm., $n_D^{25}=1.4780$ | 5.0 |
| (4) B.R. 145–160° C./0.25 mm., $n_D^{25}=1.4780$ | 41.0 |
| | 55.6 |

A sizeable amount of non-distillable, black residue is left in the distillation flask. Cuts 3 and 4 are combined and distilled through a Vigreux column. 5.0 parts of material of B.P. 110–130° C./0.05 mm. is discarded, while 16.0 parts of a colorless liquid; B.P. 128° C./0.025–131° C./0.05 mm. is then collected ($n_D^{25}=1.4820$).

*Analysis.*—Calcd. for $(C_3H_7OPF_2)_3Mo(CO)_3$: C, 25.6; H, 3.7; F, 20.2; Mo, 17.0; P, 16.5; mol. wt., 564.19. Found: C, 25.7; H, 3.9; F, 20.8; Mo, 15.9; P, 17.0; mol. wt., 562.

*I.R. spectrum (liquid in* $CCl_4$).—2960 (m.), 2880 (sh), 2053 (sh.), 2024 (s.), 1953 (v.s.), 1462, (m., bd.), 1389 (m.), 1274, 1252 (w.), 1145 (m.), 1051 (s.), 997 (v.), 904 (m.), 844 (v.s.), 813 (v.s.), 725 (w.).

EXAMPLE 18

*Tricarbonyl-tris(1,3-dioxa-4,5-benzo-2-fluorophosphole)-molybdenum (0)*

Upon reaction of 2.72 parts of cycloheptatriene tricarbonylmolybdenum (0) with 15.8 parts of 1,3-dioxa-4,5-benzo-2-fluorophosphole, 4.0 parts (61%) of white crystals are isolated; M.P. 89.5–91° C. (sample twice recrystallized from hexane).

*Analysis.*—Calcd. for $(C_6H_4O_2PF)_3Mo(CO)_3$: C, 38.6; H, 1.9; F, 8.7; Mo, 14.7; P, 14.2; mol. wt., 654.2. Found: C, 38.7; H, 2.0; F, 8.6; Mo, 15.2; P, 14.2; mol. wt. 651.

*I.R. spectrum (solid in* KBr).—~3000 (v.s.), 2041, 1990, 1970 (v.s.), 1624 (m.), 1579 (m.), 1476 (v.s.), 1439 (m.), 1409 (w.), 1327 (s.), 1221 (v.s.), 1145, 1092 (m.), 1008 (s.), 925 (m.), 879, 847, 779 (v.s.), 738 (s.), 719, 697 (m.).

EXAMPLE 19

*Reaction of chromium hexacarbonyl with 1,3-dioxa-4,5-benzo-2-fluorophosphole*

From a mixture of 22.0 parts of chromium hexacarbonyl and 11 parts of 1,3-dioxa-4,5-benzo-2-fluorophosphole, refluxed in ethylcyclohexane for 5 hours in a nitrogen atmosphere, a product consisting essentially of tricarbonyl-tris(1,3-dioxa - 4,5 - benzo-2-fluorophosphole) chromium (0), is obtained.

EXAMPLE 20

*Reaction of urene chromium tricarbonyl with piperidine-N-difluorophosphine*

A mixture consiting of 13.5 parts of tricarbonyl durenechromium (0) and 76.5 parts of piperidine-N-difluorophosphine is heated in a nitrogen atmosphere for 6 hours at 160° C. Tricarbonyl-tris(piperidine-N-difluorophosphine)-chromium (0) is isolated in good yield.

EXAMPLE 21

*Reaction of tungsten hexacarbonyl with phenyldifluorophosphite*

The procedure of Example 16 is followed except that 8.8 parts of tungsten hexacarbonyl and 48.6 parts of phenyldifluorophosphite replace the reactants. A mixture of substitution products, with tricarbonyl-tris-(phenyldifluorophosphite)tungsten (0) predominating, is isolated from the residue.

The reaction of iron carbonyl which follow are all carried out in Monel cylinders flushed with nitrogen and cooled to liquid nitrogen temperature. The reaction mixtures are usually heated for two 3 hours periods. After the first, the cylinders are cooled to −80° C. and the CO formed is vented.

EXAMPLE 22

*Reaction of iron pentacarbonyl with n-propyldifluorophosphite*

A mixture of 9.8 parts of $Fe(CO)_5$ and 25.6 parts of $n\text{-}C_3H_7OPF_2$ is placed in a Monel cylinder which is cooled and evacuated to 1 mm. The vessel and contents is then heated to 200° C. for 3 hours. After cooling and venting, the heating is repeated. Upon discharging, a yellow oil is obtained. The oil is rinsed out with ether. The ether solution (under nitrogen protection) is briefly boiled with charcoal, filtered and the ether is removed by distillation at atmospheric pressure (29.2 parts of product is obtained). The last volatile products are finally removed in vacuo (50–60° C./100 mm. to 30° C./0.1 mm.). A sample of this material is analyzed (*a*) $n_D^{25}=1.4590$. Redistillation is accompanied by some decomposition and disproportionation, although a yellow oil boiling over a range from ca. 91–115° C./5 mm. is collected (*b*) $n_D^{25}=1.4554$. Both products are stable in the atmosphere.

*Analysis.*—Calcd. for $Fe(CO)_2(C_3H_7OPF_2)_3$: C, 26.6; H, 4.3; Fe, 11.3; P, 18.7; mol. wt. 496. Found (*a*) C, 29.6; H, 5.1, Fe, 11.3; P, 17.6; (*b*) C, 29.5; H, 5.0; Fe, 11.6; P, 17.3; mol. wt. 495, 445.

The I.R. spectrum in $CCl_4$ solution exhibits *one* very strong CO absorption (1942 cm.$^{-1}$) and shoulders at 1989 and 1995 cm.$^{-1}$, respectively, indicative of the high symmetry of $Fe(CO)_2L_3$.

EXAMPLE 23

*Reaction of iron pentacarbonyl and 1,3-dioxa-4,5-benzo-2-fluorophosphole*

A Monel cylinder flushed with nitrogen is charged with a mixture of 9.8 parts of $Fe(CO)_5$ and 31.6 parts of 1,3-dioxa-4,5-benzo-2-fluorophosphole. After cooling to −190° C., the cylinder is evacuated to 0.2 mm. and heated for two 3-hour periods at 200° C.

A brown, viscous liquid is recovered, which is dissolved in ether, boiled briefly with charcoal, filtered and evaporated, first at atmospheric pressure, then under vacuum, finally at 30° C./0.2 mm. A light brown extremely viscous oil is obtained which does not crystallize when held at 0° C. for several days. The oil is dissolved in the minimum amount of benzene, and hexane is added until the solution becomes cloudy. Upon cooling to 0° C. a brown oil separates rapidly which does not crystallize. The I.R. spectrum of this oil exhibits essentially one strong CO absorption at 1970 cm.$^{-1}$, indicative of simple substitution products of $Fe(CO)_5$. Chemical analysis indicates the oil is a mixture of substitution products.

EXAMPLE 24

*Reaction of iron pentacarbonyl and ethylene glycol bis-(difluorophosphite)*

A mixture of 4.9 parts of iron pentacarbonyl and 14.8 parts of $F_2POCH_2CH_2OPF_2$ is cooled to —190°, evacuated to 0.1 mm. and heated for three 3-hour periods at 200° C. bath temperature. A total of 10.0 parts of yellow, brittle solid is recovered and finely ground and dried in vacuo.

The material is insoluble in a variety of common organic solvents such as aliphatic and aromatic hydrocarbons, alcohols, ketones, acetonitrile, dioxane, but is dissolved by dimethylsulfoxide and dimethylformamide, indicating its polymeric character.

A sample of the crude material is extracted with benzene in a Soxhlet apparatus for 8 hours. A trace amount of a dark yellow oil is extracted. The bulk of the product remains unchanged and is dried in vacuo.

The light brown product does not change visibily when heated up to 260° C. on a melting point block in the atmosphere. On the thermolbalance, however, some weight loss is observed at 170° C., becoming rapid above 200° C. Analytical data indicate the replacement of two CO groups by the bis-fluorophophite ligand.

*Analysis.*—Calcd. for $Fe(CO)_3(F_2POCH_2CH_2OPF_2)$: C, 17.7; H, 1.2; Fe, 16.5. Found: C, 15.6; H, 2.7; Fe, 15.3.

I.R. spectra support its polymeric nature.

EXAMPLE 25

*Reaction of dicobalt octacarbonyl with 1,3-dioxa-4,5-benzo-2-fluorophosphole*

To a solution of 3.42 parts of $CO_2(CO)_8$ in hexane is added in a nitrogen atmoshpere 15.8 parts of

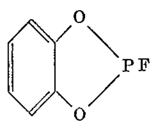

The mixture is held at or below room temperature until the evolution of CO has subsided. The product corresponds to the composition

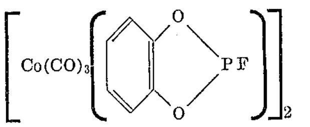

EXAMPLE 26

*Reaction of phenyldifluorothiophosphite with nickel carbonyl*

The apparatus used and conditions employed are essentially identical with those given in Example 2. Eight and six-tenths parts of nickel carbonyl is added dropwise with stirring to 53.2 parts of phenyldifluorothiophosphite. The temperature is gradually increased until the evolution of carbon monoxide subsides. The tetrasubstituted complex, $Ni(C_6H_5SPF_2)_4$, is isolated in good yield.

EXAMPLE 27

*Reaction of ethyl-piperidyl-prosphoramidofluoridite with nickel carbonyl*

Following the procedure of Example 26, 8.6 parts of nickel carbonyl is added dropwise with stirring to 53.7 parts of ethyl - piperidyl-phosphoramidofluoridite. The temperature is gradually increased until the I.R. spectrum indicates the complete substitution of carbon monoxide groups. The product corresponds to the composition

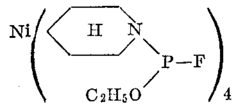

The novel coordination compounds of this invention are complexes of unusual stability. Even when exposed to the atmosphere, to water or to nonoxidizing acids and bases, the compounds are stable—a behavior which is surprising for phosphorus-containing complexes of zerovalent metals. The polymeric products show no crystallinity toward X-rays, and are chemically inert toward the atmosphere and organic solvents. They do not melt and those containing no carbon monoxide do not decompose when heated in the atmosphere at temperatures of about 250–300° C. They are markedly hydrophobic and cannot be compacted at room temperature.

The products of this invention are useful catalysts, for instance for the quick polymerization of caprolactam and the cyclization of acetylenes. They are also useful coating compositions. High temperature stable coatings are prepared from the polymers by suspending the finely divided powders in a vehicle for application to the surface. Or smooth, mirror-like, metal coatings are obtained when the products are heated above their decomposition temperatures. Nickel mirrors are obtained, for example, when the complexes $Ni(C_3H_7OPF_2)_4$ or $Ni(C_6H_5OPF_2)_4$ are heated under vacuum and coatings of molybdenum and iron are obtained by decomposition of their complexes. The products are also useful biological agents. For instance the nickel complexes are especially effective against mites and aphids when applied from a 1% solution.

I claim:

A chelate compound of the formula $M(CO)_x(L')_y$ wherein M is a member of the group of transition metals consisting of iron, nickel, chromium, tungsten and molybdenum, $x$ is one through four, $y$ is one through two, the sum of $x$ and $y$ is equal to one half the difference between the actual atomic number of M and the effective atomic number of M, and L' is a member of the group of bifunctional ligands consisting of

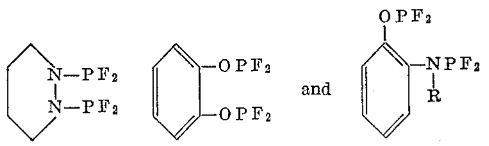

wherein R is a hydrocarbon radical.

References Cited by the Examiner

UNITED STATES PATENTS 3,102,899 9/1963 Cannell ------------ 260—439
3,117,983 1/1964 Matthews ---------- 260—438

FOREIGN PATENTS 882,400 11/1961 Great Britain.

(Other references on following page)

OTHER REFERENCES

Abel et al.: J. Chem. Soc. (London), July 1959, pp. 2323 to 2327.

Hieber et al.: Ibid., page 1417.

Malatesta et al.: Annali Di Chimica (Italy), vol. 44, No. 1–6 (1954).

Meriwether et al.: J.A.C.S., volume 83, pp. 3192 to 3196, August 1961.

Seel et al.: Berichte der Deutschen Chemischen Gesellschaft, vol. 94, No. 5, pp. 1173 to 1184 (pages 1174 and 1180 principally relied on).

TOBIAS E. LEVOW, *Primary Examiner.*